United States Patent
Bigolin

(10) Patent No.: US 10,166,702 B2
(45) Date of Patent: Jan. 1, 2019

(54) DEVICE AND METHOD FOR THE MANUFACTURING OF A SUPPORT FOR THE HUMAN BODY

(71) Applicant: SELLE ROYAL S.P.A., Pozzoleone (IT)

(72) Inventor: Barbara Bigolin, Asolo (IT)

(73) Assignee: SELLE ROYAL S.P.A., Pozzoleone (IT)

( * ) Notice: Subject to any disclaimer, the term of this patent is extended or adjusted under 35 U.S.C. 154(b) by 62 days.

(21) Appl. No.: 14/905,178

(22) PCT Filed: Jul. 17, 2013

(86) PCT No.: PCT/IB2013/055889
§ 371 (c)(1),
(2) Date: Jan. 14, 2016

(87) PCT Pub. No.: WO2015/008110
PCT Pub. Date: Jan. 22, 2015

(65) Prior Publication Data
US 2016/0176082 A1    Jun. 23, 2016

(51) Int. Cl.
*B29C 39/00* (2006.01)
*B29C 39/02* (2006.01)
(Continued)

(52) U.S. Cl.
CPC .............. *B29C 39/025* (2013.01); *A47C 5/00* (2013.01); *A47C 7/38* (2013.01); *A47C 7/40* (2013.01);
(Continued)

(58) Field of Classification Search
CPC ... B29C 33/306; B29C 39/021; B29C 39/025; B29C 45/2673; B29C 45/2675;
(Continued)

(56) References Cited

U.S. PATENT DOCUMENTS 4,345,965 A * 8/1982 Lindenmayer ........ B29C 43/027
156/500
4,861,254 A * 8/1989 Takeuchi ............ B29C 45/2673
425/190
(Continued)

FOREIGN PATENT DOCUMENTS

| EP | 1659052 | | 5/2006 | |
|---|---|---|---|---|
| JP | 61211010 A | * | 9/1986 | ........... B29C 33/306 |
| JP | 09207173 A | * | 8/1997 | ......... B29C 45/2675 |

*Primary Examiner* — Timothy Kennedy
(74) *Attorney, Agent, or Firm* — Tutunjian & Bitetto, P.C.

(57) ABSTRACT

A device for manufacturing a support for the human body, of the type including a mold including a lower female portion and an upper male portion capable of being coupled with one another so as to define at least one cavity between them inside which at least one material in the fluid state intended to make the support can be poured. The female portion of the mold includes at least one mobile block including at least two different surfaces suitable for making up respective different bottoms of said cavity for separate pouring steps of at least one material in the fluid state foreseen in the support. A process for manufacturing a support for the human body is moreover presented.

19 Claims, 4 Drawing Sheets

(51) Int. Cl.
    B29C 33/30      (2006.01)
    B29C 45/26      (2006.01)
    B29C 43/04      (2006.01)
    B29C 39/04      (2006.01)
    B29C 44/08      (2006.01)
    B29C 44/58      (2006.01)
    A47C 5/00       (2006.01)
    A47C 7/38       (2006.01)
    A47C 7/40       (2006.01)
    A47C 7/54       (2006.01)
    B25G 1/10       (2006.01)
    B62J 1/00       (2006.01)
    B29L 31/30      (2006.01)
    B29K 75/00      (2006.01)
    B29K 105/04     (2006.01)

(52) U.S. Cl.
    CPC .............. *A47C 7/54* (2013.01); *B25G 1/10* (2013.01); *B29C 33/306* (2013.01); *B29C 39/021* (2013.01); *B29C 39/04* (2013.01); *B29C 43/04* (2013.01); *B29C 44/086* (2013.01); *B29C 44/585* (2013.01); *B29C 45/2673* (2013.01); *B29C 45/2675* (2013.01); *B62J 1/00* (2013.01); *B29K 2075/00* (2013.01); *B29K 2105/04* (2013.01); *B29L 2031/3094* (2013.01)

(58) Field of Classification Search
    CPC .............. B29C 43/04; B29C 2043/043; B29C 2043/3676; B29C 45/1628; B29C 45/5605; B29C 2045/2677; B29C 2045/2679; B29C 39/04
    See application file for complete search history.

(56) References Cited

U.S. PATENT DOCUMENTS

| | | |
|---|---|---|
| 6,450,572 B1 | 9/2002 | Kuipers |
| 2003/0219554 A1 | 11/2003 | Wang |
| 2006/0125134 A1* | 6/2006 | Lin ................ A43B 3/108 264/45.1 |
| 2010/0098797 A1* | 4/2010 | Davis .............. B29D 35/0036 425/129.2 |

* cited by examiner

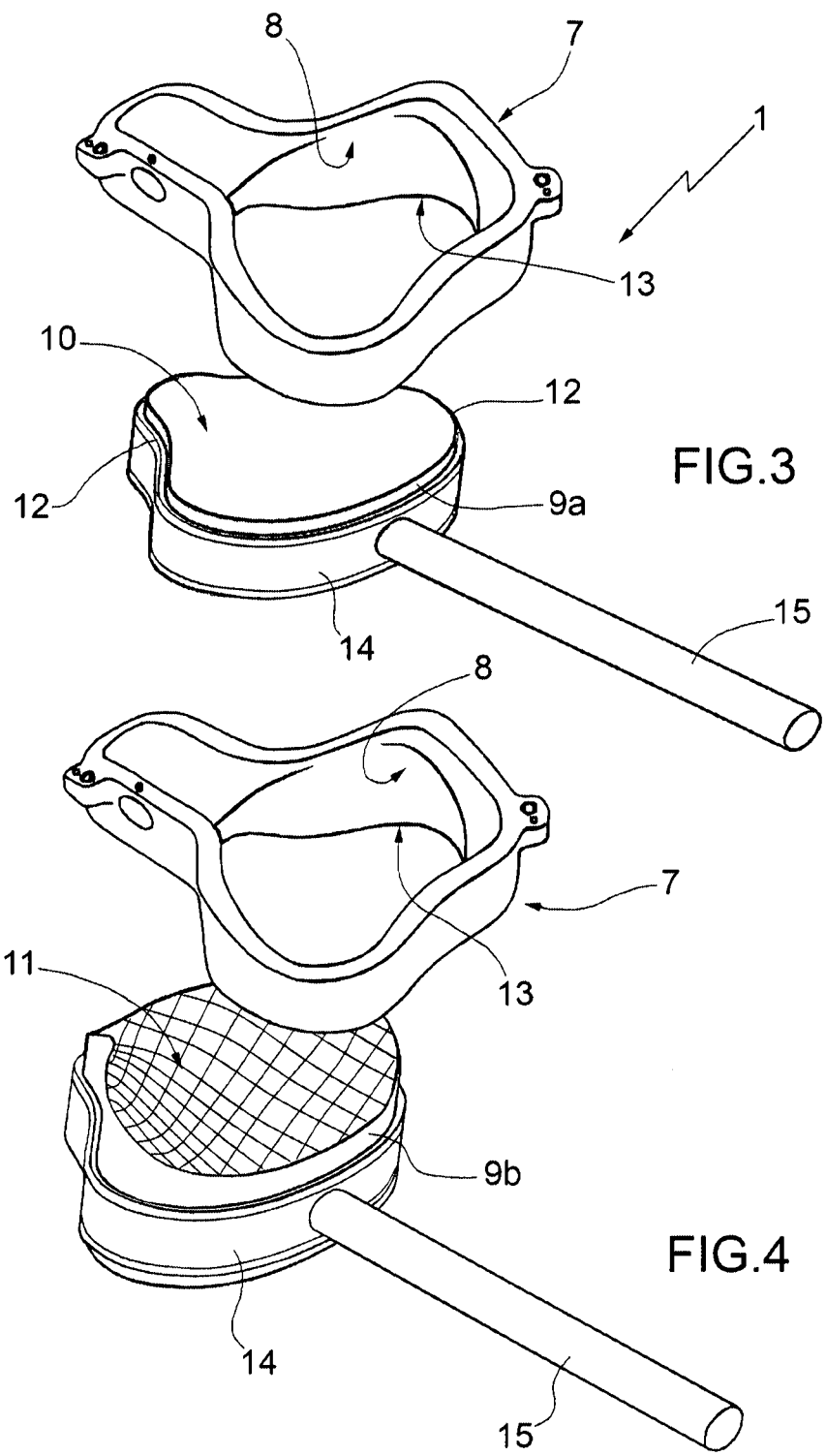

DEVICE AND METHOD FOR THE MANUFACTURING OF A SUPPORT FOR THE HUMAN BODY

TECHNICAL FIELD OF THE INVENTION

The present invention concerns a device and a process for manufacturing a support for the human body. More in particular, the present invention concerns a device and a process for manufacturing a support for the human body such as for example a saddle for means of transport like cycles or motorcycles, a seat, a grip, a handle, an arm rest, a back rest, a head rest, and the like.

STATE OF THE ART

In some production sectors, like for example those for manufacturing means of transport like cycles, motorcycles and the like, or also in other fields, like for example the production sectors of various kinds of machinery, or of furniture elements, or sport and leisure equipment, elements for supporting the human body are used, of course for the most diverse purposes.

For example, in the sector of manufacturing cycles and motorcycles, such support elements can be made up of saddles, or handles for resting hands, and the like.

In the specific sector of manufacturing bicycles, one known type of saddles—mainly but not exclusively for bicycles—comprises a rigid or semi-rigid base element, also called body, a filling element made up of elastically yielding material, usually made from expanded polyurethane, one or more layers of different material such as gel or the like concentrated for example in the area of greatest specific pressure, and a covering element made from leather, artificial leather or similar, intended to come into contact with the seat of the user.

In particular the layer of gel has the function, because of its known properties, of ensuring a certain level of comfort to the user in the area of greatest specific pressure.

In European patent EP 0 653 279 by the same applicant a process for manufacturing a saddle for bicycles is described, provided with a layer of gel enclosed between the filling element in polyurethane foam and the outer covering element.

As described in such a document, the manufacturing process foresees the provision of a female mould in which the covering element is initially positioned, held for example with the aid of vacuum generation means. Subsequently, the layer of gel is poured, in the fluid state and therefore without an actual shape, directly on the covering element.

Following solidification, or cross-linking, of the layer of gel, the filling element, i.e. typically polyurethane foam, is poured into the female mould.

It is then applied onto the male mould that carries the felt so as to obtain the final object of the desired shape.

A critical step of the present process is that of pouring the gel in the fluid state.

Indeed, once poured on the covering element, the layer of gel in the fluid state is naturally positioned so as to define a free surface, i.e. it self-levels.

This natural arrangement of the layer of gel, as illustrated in document EP 0 653 279, determines areas with different thickness in relation to the specific shape of the female mould, i.e. the final shape of the surface of the saddle to be made.

More in particular, in the areas of the female mould with greater concavity an excessive amount of gel is deposited with respect to that which is deposited in areas with a smaller concavity.

This determines the production of a saddle with a layer of gel—or many layers of gel—which has areas with different thicknesses that do not necessarily correspond to the actual comfort requirements of the user in the seat, and in any case that cannot be controlled with the necessary accuracy.

SUMMARY OF THE INVENTION

The technical task of the present invention is thus that of improving the state of the art.

In such a technical task, one purpose of the present invention is to devise a device for manufacturing a support for the human body which makes it possible to make supports with the desired outer shape and comprising one or more layers of gel with the desired thickness, and arranged in the desired areas of the support without any limitation, and also not connected to one another.

Another purpose of the present invention is to devise a process for manufacturing a support that is suitable for the human body that is suitable for being made with the aforementioned device.

Such a task and such purposes are achieved with the device for manufacturing a support for the human body according to the present principles, and with a process for manufacturing the support according to the present principles.

The present specification refers to preferred and advantageous embodiments of the invention.

BRIEF DESCRIPTION OF THE DRAWINGS

The characteristics of the invention shall become clearer by any man skilled in the art from the following description and from the attached drawing tables, given as an example and not for limiting purposes, in which:

FIG. 3 is a perspective detailed view of the device according to the invention in another embodiment;

FIG. 4 is a perspective view of the device in the embodiment of FIG. 3, in a further step of the manufacturing process;

DETAILED DESCRIPTION OF THE INVENTION

Figure 1:
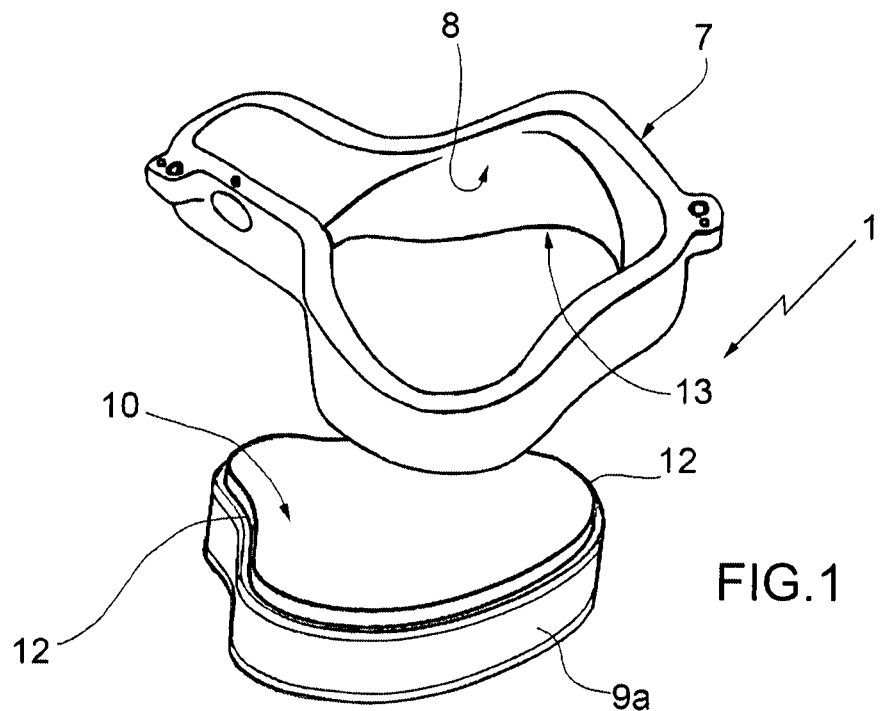
FIG. 1 is a perspective detailed view of the device according to the invention, illustrating the female portion of the mould and a first mobile block in a step of the manufacturing process.

With reference to the attached FIG. 1, a device for manufacturing a support for the human body according to the present invention is wholly indicated with reference numeral 1.

Figure 5:
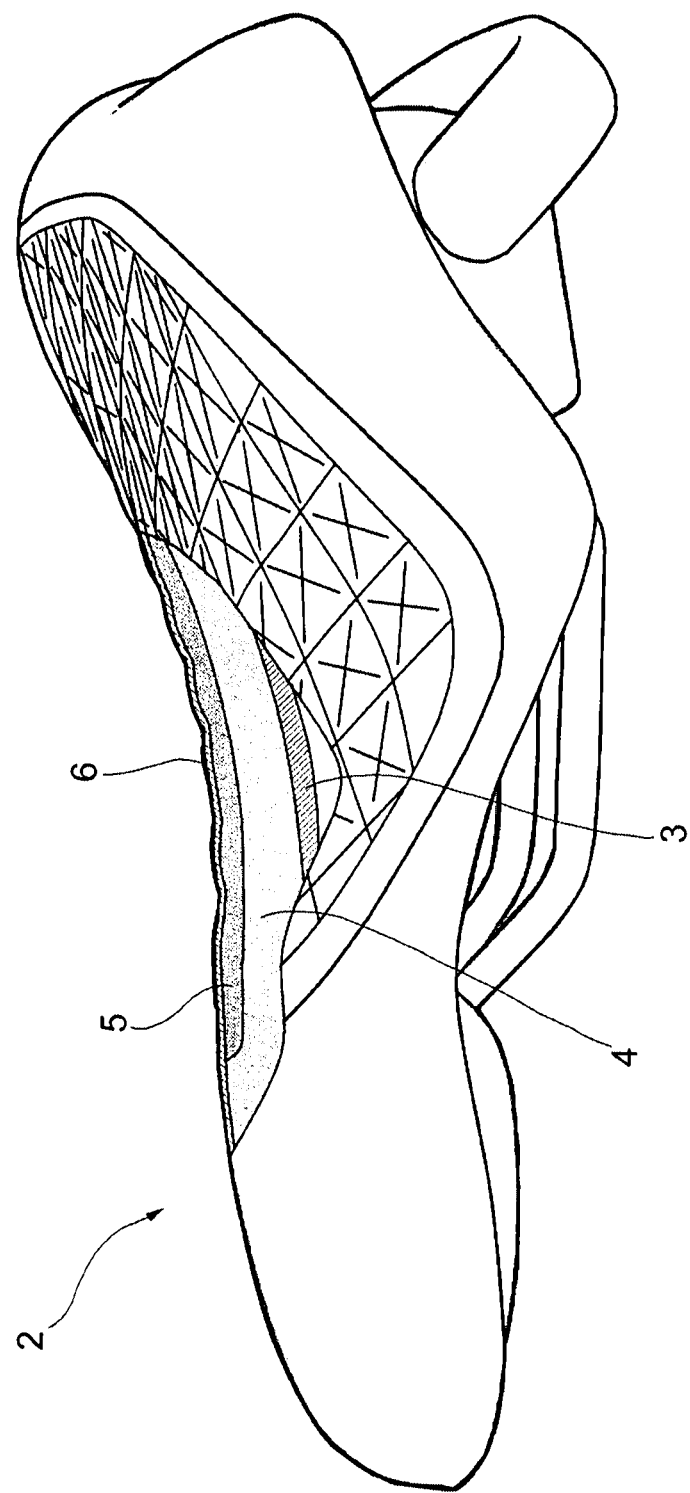
FIG. 5 is a side section view of a support made with the device and the process according to the present invention.

In particular the support, wholly indicated with reference numeral 2, that can be made with the device 1 according to the invention and described in the rest of the description is a saddle for bicycles, illustrated in FIG. 5.

Of course, the device 1 can also be used for making a support of a different kind, or rather having a different shape, other dimensions and with different characteristics, without any limitation.

More in detail, the saddle 2 that can be made with the device 1 and the manufacturing process according to the invention is of the type comprising a rigid or semi-rigid base element 3, also called a body, and a filling element 4, made in a filling material, and coupled with the base element 3.

The base element 3 can have any shape and sizes, and can be made from any material, for example metal, plastic material, composite material, or the like.

The saddle 2 also comprises at least one layer 5 of a yielding material that is coupled with the filling element 4 and concentrated, for example, in the area of greatest specific pressure of the saddle 2, and a covering element 6 that is intended to come into contact with the seat of the user.

In the saddle 2 represented in particular in FIG. 5, the layer 5 has a surface shape that is provided with repeated patterns in relief, for example diamond shapes or similar, that are suitable for increasing the friction with the seat of the user and for therefore providing him with greater comfort.

In other embodiments of the invention, however, such patterns in relief may not be present.

Of course, the layer 5 could also be substantially smooth, or rather without repeated patterns in relief.

In one preferred embodiment of the invention, the filling material with which the filling element 4 is made consists of polyurethane foam or of a material having similar properties, i.e. an elastically yielding material that is already used in manufacturing these types of products.

The yielding material with which the layer 5 is made is on the other hand made up of gel or similar, i.e. a material that is very soft and suitable for providing a sensation of comfort to the user mainly in the area of high specific pressure.

Alternatively, such a yielding material can be made up of rubber, polymers with a lattice structure, expanded rubber or similar, or other flexible polyurethane materials with different characteristics in terms of density, viscosity, performance with respect to the filling material.

The manufacturing device 1 described in the present invention is meant to be inserted in a more complex apparatus for moulding supports for the human body such as saddles for bicycles and the like.

Such apparatus comprises further parts and components, in addition to the ones that have been illustrated, which are per se known and that shall not be described in further detail.

The device 1 according to the present invention is of the type comprising a mould provided with a lower female portion 7, and an upper male portion.

The male portion of the mould is not represented in the figures, for the sake of simplicity, but has characteristics that are essentially known in these types of applications.

Figure 6:
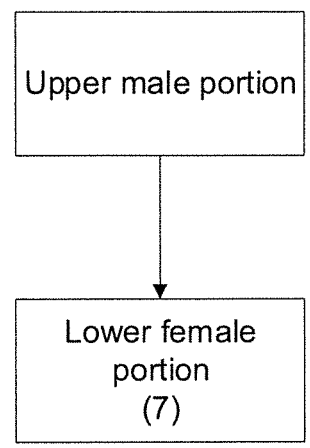
FIG. 6 is a schematic representation of an upper male portion with respect to a lower female portion.

However, FIG. 6 is provided as a schematic representation of an upper male portion with respect to a lower female portion.

The male portion and the female portion 7 of the mould are capable of being coupled with one another so as to define at least one cavity 8 between them.

For example, the male portion and the female portion 7 can be hinged to one another, as described in the already mentioned patent EP 0 653 279 by the same applicant, or they can be coupled according to a different method.

According to one aspect of the present invention, the female portion 7 of the mould comprises at least one mobile block 9a, 9b.

More in detail, the female portion 7 of the mould comprises a first mobile block 9a and a second mobile block 9b.

The mobile blocks 9a, 9b are interchangeable with one another, and respectively comprise two different surfaces 10,11 that are suitable for making up respective different bottoms of the cavity 8 for separate pouring steps of at least one material in the fluid state foreseen in the support.

The first block 9a and the second block 9b can be made interchangeable through suitable automatic replacement means.

More in detail, according to one aspect of the present invention the different surfaces 10,11 of the mobile blocks 9a, 9b are suitable for making respective different interchangeable bottoms of the cavity 8 for separate pouring steps in which the aforementioned filling and yielding materials are poured, respectively, as shall be described in further detail in the rest of the description.

In greater detail, the aforementioned surfaces 10,11 of the mobile blocks 9a, 9b comprise a first surface 10, foreseen in the first block 9a, that is suitable for making up a respective first bottom on which the covering element 6 of the support can be positioned.

The first bottom, consisting of the first surface 10, is moreover suitable for pouring the aforementioned yielding material on the covering element 6 itself in a specific first pouring step, so as to achieve at least one layer 5 of the second yielding material, with the desired thickness, on the covering element 6.

The aforementioned first surface 10 of the first block 9a is—as illustrated in the detail of FIG. 1—substantially flat with the edges 12 raised, having a height that substantially corresponds to the thickness of the layer 5 of the yielding material to be foreseen in the support 2.

The fact that a flat first surface 10—or substantially flat—is foreseen, makes it possible to pour the yielding material of the support 2—i.e. in this case gel or other similar material—so as to obtain a layer with the desired thickness.

Indeed, in this way, self-levelling problems of the yielding material, poured in the fluid state, are thus eliminated, which would otherwise, in manufacturing devices of the known type, lead to different and uncontrolled thicknesses of the material itself inside the support 2.

With reference now, for example to the saddle 2 represented in FIG. 5, it can be observed that the shape of the upper surface thereof, from a lateral point of observation, has a certain concavity facing upwards.

With the known manufacturing processes, the pouring of gel carried out on the bottom of a conventional mould would lead, in the concerned area, to a layer 5 of gel having an uneven thickness, that is smaller at the centre of the concavity and greater at the sides, indeed due to the self-levelling thereof when poured in the fluid state.

With the solution according to the present invention, since the pouring occurs on a flat surface, undesired phenomena of self-levelling of the gel in the fluid state no longer occur.

The aforementioned surfaces 10,11 of the mobile blocks 9a, 9b moreover comprise a second surface 11, foreseen in particular in the second mobile block 9b, suitable for making up a respective second bottom on which the covering element 6 can be positioned together with the respective layer 5 of yielding material made in the first pouring step, and fixedly attached to it following its crosslinking.

The second bottom made up of such a second surface 11 is, in particular, suitable for pouring the filling material in a second pouring step for making the final shape of the support 2.

Figure 2:
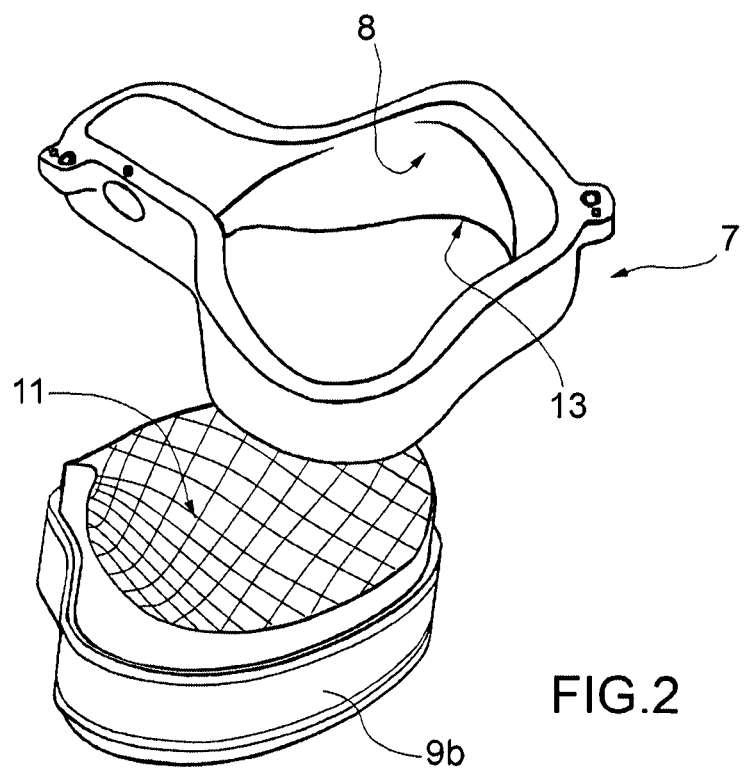
FIG. 2 is another perspective detailed view of the device, illustrating the female portion of the mould and a second mobile block in a further step of the manufacturing process.

As illustrated in the detail of FIG. 2, the second surface 11 of the second mobile block 9b has the surface pattern in relief that determines the final shape of the support 2.

Of course, such a surface pattern in relief has been shown only as a clarifying example: the second surface 11 can of course have any shape that is suitable for the specific application requirements.

The female portion 7 of the mould, as illustrated in FIGS. 1,2, has the respective open cavity 8 able to be selectively closed, at the lower opening 13, by the surfaces 10,11 of the mobile blocks 9a, 9b.

The shape of the female portion 7 represented in FIGS. 1, 2, is of course completely schematic and simplified: female portions 7 having shapes and sizes that are completely different in relation to the object to be made can be foreseen.

As mentioned, one object of the present invention also is a process for manufacturing the support 2 with the characteristics described above.

The process according to the invention is carried out with the device 1 previously described.

The process then foreseen a step of providing a mould comprising a lower female portion 7 and an upper male portion, that are capable of being coupled with one another so as to define a cavity 8 between them inside which at least one material intended to make the support 2, can be poured in the fluid state.

The process moreover foresees a step of providing at least one mobile block 9a, 9b of the aforementioned female portion 7, comprising at least two different surfaces 10,11, for making up respective different bottoms of the cavity, which are suitable for separate pouring steps of the at least one material with which the support 2 is made.

More in detail, such a step foresees providing two mobile blocks 9a, 9b that are interchangeable with one another.

The process comprises a subsequent step of positioning the first mobile block 9a with its first surface 10 at the cavity 7.

As mentioned, such a first surface 10 is suitable for making up a respective first bottom for a first pouring step.

The process then comprises a step of positioning the covering element 6 of the support 2 on the first surface 10 of the first mobile block 9a.

In particular, the latter is carried out with the aid of vacuum generation means.

This is a per se known method in these kinds of applications and it makes it possible for there to be the optimal adhesion of the covering element 6 to the first surface 10.

Subsequently, the process foresees carrying out a first pouring step of the at least one material inside the cavity 8.

In particular, this first pouring step consists of pouring the yielding material—i.e. gel or similar—so as to make the layer 5.

In this step, the yielding material is poured flat on the covering element 6 in the desired amount and in the desired areas, so as to achieve one or more layers 5 of the required thickness and with the required shape characteristics.

In such a step, if present, the further additional male portion can be coupled with the female portion 7 of the mould, for forming the inner surface of the layer 5 of yielding material.

This first step is technically particularly advantageous for a series of reasons.

First of all the consumption of yielding material—for example gel—for the production of the support 2 is considerably reduced, since it is possible to dose with a certain precision the amount of material used: indeed, the bottom of the mould does not need to be filled with material as occurs, on the other hand, in conventional manufacturing methods.

This also translates into a reduction in the cost of the product, since less amount of such material is used for the same characteristics of the object.

Moreover, the support 2 obtained can be manufactured in an extremely personalised manner, since the layer of yielding material can be made precisely in the desired areas and with the desired thickness.

Also the manufacturing efficiency is optimised since, as shall become clearer in the rest of the description, all the manufacturing steps can be carried out automatically without slowing down, for example, the rotation of the conventional carousels used in this type of technologies so as to let the layer of poured material, for example gel, dry.

The economic advantages also concern the production plant, since the new process can be applied with existing apparatuses and without needing to integrate new machinery.

In addition to this the covering element 6 is never moved manually during the manufacturing steps, and this makes it possible to obtain considerable advantages from the economic point of view.

At the end of this first pouring step, the process foresees a step for removing the first mobile block 9a.

Of course, this step must be preceded by a vacuum releasing step if it was used for keeping the covering element 6 in position.

It is then foreseen for there to be a step of positioning the second mobile block 9b with its second surface 11 at the cavity 8 of the female portion 7 of the mould.

As mentioned, the second surface 11 of the second mobile block 9b is suitable for making up a respective second bottom for the second pouring step.

Once the second block 9b has been positioned, the covering element 6, together with the layer 5 of yielding material made in the previous first pouring step, is positioned on the second surface 11 of the second block 9b itself.

Also this positioning step is preferably carried out with the aid of vacuum generation means.

At this point, a second pouring step of material is carried out.

More in detail, such a second pouring step consists of pouring the filling material that is suitable for making the filling element 4 of the support 2.

This step occurs in the manner already foreseen in known types of apparatuses and manufacturing processes, therefore its description does not need further details. Following the second pouring step, the male portion of the mould is closed, i.e. that necessary for obtaining the final shape of the support 2.

It is then foreseen for there to be a step of curing the filling material inside the mould, which is per se known in this type of application.

At the end of this curing step, the finished support 2 is extracted from the mould.

As mentioned, the process object of the invention can be applied on any known apparatus, with obvious advantages from the economic point of view, but also on apparatuses of other types.

Another important advantage ensured by the present invention is the possibility, by acting on suitable process parameters, of obtaining on the surface of the support 2 three-dimensional graphic effects that are visible to a greater or lesser extent, i.e. they are more or less deep.

Such process parameters can be, for example, the cross-linking time of the yielding material—for example gel—and the period of time between the pouring step of the yielding material and the pouring step of the filling material.

If the crosslinking time of the yielding material is long, the latter is more suitable for obtaining deep and clearly visible three-dimensional effects, since it can be deformed to a greater extent.

Moreover, if the period of time between the pouring step of the yielding material and that of pouring the filling material is relatively high, the yielding material becomes less deformable, and thus less suitable for obtaining deep three-dimensional effects.

The two parameters can be varied independently from one another so as to obtain the desired effects, or else they can both be managed within the same process so as to obtain a great variety of possible effects.

Another embodiment of the device 1 according to the invention is illustrated in FIGS. 3,4.

In this embodiment, the two mobile blocks 9a,9b are associated to a single rotary support 14.

The two mobile blocks 9a,9b have the same function described for the previous embodiment of the invention.

The two mobile blocks 9a,9b are positioned, on the common support 14, opposite one another.

The support 14 is associated to respective rotation means that are wholly indicated with reference numeral 15.

The rotation means 15 can comprise, for example, a horizontal axis that is connected to an electric, pneumatic, hydraulic or similar motor, or other equivalent means.

The possibility of rotating the support 14 around a horizontal axis makes it possible to select the block 9a,9b to be used in the different manufacturing steps of the support 2.

With this solution, therefore, it is not necessary to replace one of the blocks 9a,9b with the other one during the production, but the support 14 can simply be rotated around the axis of the rotation means 15 by 180°.

Moreover, the support 14 is mobile according to a vertical direction, so as to be able to move away from the female portion 7 of the mould in the various steps of the manufacturing process.

For this purpose, the support 14 is associated with respective translation means.

Such translation means are not represented in the figures, but are of the known type: for example they can be of the type comprising a pneumatic actuator, or the like.

With reference, on the other hand, to the manufacturing process carried out by using the device in accordance with the second embodiment described above, it should be observed that, with respect to the previous embodiment, the step of positioning the second mobile block 9b for carrying out the following step of pouring filling material occurs by rotating the support 14, which encloses both the mobile blocks 9a,9b, upon itself by 180°, as shown in FIGS. 3,4.

It has thus been seen how the invention reaches the proposed purposes.

The present invention has been described according to preferred embodiments, but equivalent variants can be conceived without departing from the scope of protection offered by the following claims.

The invention claimed is:

1. A device for manufacturing a support for a human body, comprising a mould comprising a lower female portion and an upper male portion capable of being coupled with one another so as to define at least one cavity between them, inside which at least one material in the fluid state intended to make the support can be poured, wherein said female portion of the mould has a lower through opening and further comprises at least one mobile block comprising at least two different surfaces, each surface configured to selectively close said cavity at the lower through opening of said female portion of the mould for making respective different bottoms of said cavity during separate pouring steps of at least one material in the fluid state to make the support.

2. The device according to claim 1, for manufacturing a support comprising a rigid or semi-rigid base element, a filling element made up of a filling material and coupled with said base element, at least one layer of a yielding material, coupled with said filling element and concentrated near to the surface of the support in the areas of greatest specific pressure, and a covering element, wherein said different surfaces of said at least one mobile block comprise a first surface suitable for making up a respective first bottom on which the covering element of the support can be positioned and suitable for the pouring of the yielding material on the covering element itself in a first pouring step, so as to achieve, on the covering element, at least one layer of the yielding material of the desired thickness.

3. The device according to claim 2, wherein said different surfaces of said at least one mobile block comprise a second surface making up a respective second bottom on which the covering element can be positioned together with the respective at least one layer of the yielding material made in said first pouring step, said second bottom being suitable for pouring the filling material in a subsequent second pouring step for making the final shape of the support.

4. The device according to claim 1, wherein said female portion of the mould comprises a respective open cavity that can be selectively closed by said different surfaces of said at least one block.

5. The device according to claim 2, wherein said first surface of said at least one mobile block is flat with raised edges, having a height corresponding to the thickness of the layer of the yielding material in the support.

6. The device according to claim 1, wherein said at least one mobile block comprises a first interchangeable block having a first surface and a second interchangeable block having a second surface.

7. The device according to claim 1, wherein said at least one mobile block comprises a first block and a second block both on a single rotary support.

8. The device according to claim 2, wherein said filling material is polyurethane foam.

9. The device according to claim 2, wherein said yielding material is selected from gel, rubber, polymers with a lattice structure, expanded rubber or flexible polyurethane materials.

10. A process for manufacturing a support for the human body, wherein it comprises the steps of:
providing a mould comprising a lower female portion and an upper male portion capable of being coupled with one another so as to define, between them, at least one cavity inside which at least one material in the fluid state, intended to make the support, can be poured, wherein said lower female portion of the mould has a lower through opening;
providing at least one mobile block for said female portion comprising at least two different surfaces, each surface configured to selectively close said at least one cavity at the lower through opening of said lower female portion of the mould for making respective different bottoms of said cavity during separate pouring steps of said at least one material;

positioning said at least one mobile block with a first surface at said cavity, said first surface being suitable for making up a respective first bottom for a first pouring step of said at least one material;

carrying out a first pouring step of said at least one material inside said cavity;

positioning said at least one mobile block with a second surface at said cavity, said second surface being suitable for making up a respective second bottom for a second pouring step of said at least one material;

carrying out a second pouring step of said at least one material inside said cavity; and closing said male portion of the mould.

11. The process according to claim 10, wherein said support is of the type comprising a rigid or semi-rigid base element, a filling element coupled with said base element and made up of a filling material, at least one layer of a yielding material coupled with said filling element and concentrated near to the surface of the support for example in the area of greater specific pressure, and a covering element, wherein said carrying out a first pouring step consists of pouring said yielding material so as to make a respective layer.

12. The process according to claim 11, wherein said carrying out of a second pouring step consists of pouring said filling material.

13. The process according to claim 11, comprising a step of positioning the covering element of the support on said first surface before said step of pouring said yielding material so as to make a respective layer.

14. The process according to claim 11, comprising a step of positioning the covering element of the support, joined with a respective layer of the yielding material made in said first pouring step, on said second surface before said step of pouring said filling material for making the filling element of the support.

15. The process according to claim 10, wherein said at least one mobile block comprises a first block and a second block respectively provided with said first surface and second surface.

16. The process according to claim 13, wherein said step of positioning the covering element of the support on said first surface and/or said second surface of said at least one block is carried out with the aid of vacuum generation means.

17. The process according to claim 10, wherein said filling material is of the polyurethane foam type or similar.

18. The process according to claim 10, wherein said yielding material is selected from gel, rubber, polymers with a lattice structure, expanded rubber or similar, flexible polyurethane materials.

19. The process of claim 10, wherein after the step of closing, further comprising the steps of curing said at least one material and extracting the support from the mould.

* * * * *